United States Patent
Urabe et al.

(10) Patent No.: US 11,597,250 B2
(45) Date of Patent: Mar. 7, 2023

(54) HUB BRACKET STRUCTURE

(71) Applicant: HONDA MOTOR CO., LTD., Tokyo (JP)

(72) Inventors: Hiroyuki Urabe, Wako (JP); Takayuki Toyoshima, Wako (JP); Toshiaki Matsuzawa, Tokyo (JP); Toru Takenaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/548,925

(22) Filed: Dec. 13, 2021

(65) Prior Publication Data

US 2022/0185057 A1 Jun. 16, 2022

(30) Foreign Application Priority Data

Dec. 15, 2020 (JP) .............................. JP2020-207229

(51) Int. Cl.
*B60G 21/05* (2006.01)
*B60G 7/00* (2006.01)

(52) U.S. Cl.
CPC ........... *B60G 21/051* (2013.01); *B60G 7/001* (2013.01); *B60G 2204/148* (2013.01); *B60G 2206/20* (2013.01); *B60G 2206/50* (2013.01)

(58) Field of Classification Search
CPC ................. B60G 21/051; B60G 7/001; B60G 2204/148; B60G 2206/20; B60G 2206/50; B60G 3/14; B60G 21/052
See application file for complete search history.

(56) References Cited

U.S. PATENT DOCUMENTS

| 9,815,495 B2 | 11/2017 | Schultz et al. |
| 2008/0277893 A1 | 11/2008 | Murata |
| 2019/0168604 A1* | 6/2019 | Takenaka ............. B60K 7/0007 |

(Continued)

FOREIGN PATENT DOCUMENTS

| CN | 208576386 U | * | 3/2019 | ........... B60G 21/051 |
| JP | H01-150107 U | | 10/1989 | |

(Continued)

OTHER PUBLICATIONS

Wu, A Vehicle Body Convenient for the Mounting of the Torsion Beam Assembly, Mar. 5, 2019, EPO, CN 208576386 U, Machine Translation of Description (Year: 2019).*

(Continued)

*Primary Examiner* — Paul N Dickson
*Assistant Examiner* — Matthew D Lee
(74) *Attorney, Agent, or Firm* — Rankin, Hill & Clark LLP (57) ABSTRACT

The present disclosure relates to a hub bracket structure wherein a hub bracket that connects a trailing arm and a hub includes a hub mounting surface, a front connecting surface that connects a front portion of the hub mounting surface and the trailing arm, and a rear connecting surface that connects a rear portion of the hub mounting surface and the trailing arm, each of the front connecting surface and the rear connecting surface is formed in a plate shape extending in up-down and vehicle width directions, and an angle formed by the hub mounting surface and the front connecting surface is greater than an angle formed by the hub mounting surface and the rear connecting surface.

2 Claims, 5 Drawing Sheets

(56) References Cited

U.S. PATENT DOCUMENTS

| | | | | |
|---|---|---|---|---|
| 2020/0009959 A1* | 1/2020 | Fukasawa | ................ | B60G 9/00 |
| 2021/0008949 A1* | 1/2021 | Takahashi | ............ | B60G 21/051 |
| 2022/0185050 A1* | 6/2022 | Urabe | .................... | B60G 7/008 |

FOREIGN PATENT DOCUMENTS

| | | | | |
|---|---|---|---|---|
| JP | 2005-081905 A | 3/2005 | | |
| JP | 2007-126039 A | 5/2007 | | |
| JP | 6216836 B2 | 10/2017 | | |
| WO | WO-2012102389 A1 * | 8/2012 | ........... | B60G 21/051 |
| WO | WO-2016086291 A1 * | 6/2016 | ............. | B21D 53/88 |

OTHER PUBLICATIONS

Office Action received in corresponding Japanese application No. 2020-207229 dated Aug. 2, 2022 with English translation (6 pages).

\* cited by examiner

HUB BRACKET STRUCTURE

CROSS-REFERENCE TO RELATED APPLICATION

The present application claims the benefit of priority to Japanese Patent Application No. 2020-207229 filed on Dec. 15, 2020, the disclosures of all of which are hereby incorporated by reference in their entireties.

TECHNICAL FIELD

The present disclosure relates to a hub bracket structure.

RELATED ART

Conventionally, known hub bracket structures with a hub bracket that connects the swinging end portion of the trailing arm to the hub carrier (hub) include one that has a connector at the front portion of the hub bracket, which is composed of a horizontal plate that can be elastically compressed in the vehicle width direction when a lateral force is applied from the outside of the wheel (for example, Japanese Patent No. 6216836).

According to such a hub bracket structure, the aforementioned connector allows for toe-in control of the tire, making it possible, for example, to improve the straight-drivability of the vehicle and to improve the stability during braking by increasing the equivalent cornering power.

SUMMARY

However, in the conventional hub bracket structure, in order to achieve toe-in characteristics and forward tilting of the center of rigidity against lateral forces, bushings with different rigidity in front and rear need to be placed at appropriate positions in relation to the hub carrier, which makes the structure complicated. In addition, if the shape is simplified and symmetrical from front to rear, the joining to the hub carrier is almost always welding through the hub bracket, and the point of application is behind the tire ground contact point, so that the mere combination of the tire and hub bracket has a structural problem of toe-out characteristics against lateral forces. Additionally, in the conventional hub bracket structure, the connector is formed of a horizontal plate, so that it is likely that the hub bracket could tilt in the up-down direction against lateral force.

An object of the present disclosure is to provide a hub bracket structure that achieves improved straight-drivability of the vehicle and improved stability during braking.

An aspect according to the present disclosure to solve the above-described problem is a hub bracket structure including a trailing arm that extends in a vehicle front-rear direction, with one end thereof axially supported by a vehicle body in a manner swingable up and down, a hub that rotatably supports a wheel, and a hub bracket that connects the trailing arm and the hub. The hub bracket includes a mounting surface that extends up-down and front-rear directions and is mounted with the hub, a front connecting surface that connects a front portion of the mounting surface and the trailing arm, and a rear connecting surface that connects a rear portion of the mounting surface and the trailing arm. Each of the front connecting surface and the rear connecting surface is formed in a plate shape extending up-down and vehicle width directions, and an angle formed by the mounting surface and the front connecting surface is greater than an angle formed by the mounting surface and the rear connecting surface.

The hub bracket structure of the present disclosure can more reliably prevent unintended wheel alignment fluctuations during vehicle driving than conventional one.

DETAILED DESCRIPTION

Next, a hub bracket structure of an embodiment of the present disclosure (present embodiment) will be explained in detail.

The hub bracket structure of the present embodiment has a configuration that a front side of the hub bracket, which connects a hub to a swinging end portion of a trailing arm, is less rigid than a rear side.

Specifically, the hub bracket structure has a main characteristic that a first angle ($\alpha$), which is an interior angle between a hub mounting surface formed on an outer side in the vehicle width direction of the hub bracket and a front connecting surface formed on the front side of the hub bracket, is greater than a second angle ($\beta$), which is the interior angle between the hub mounting surface and the rear connecting surface that is formed on the rear side of the hub bracket.

Note that the front-rear, right-left, and up-down directions in the following explanation are based on arrow directions illustrated in FIG. 1, which coincide with the front-rear, right-left, and up-down of the vehicle.

Figure 1:
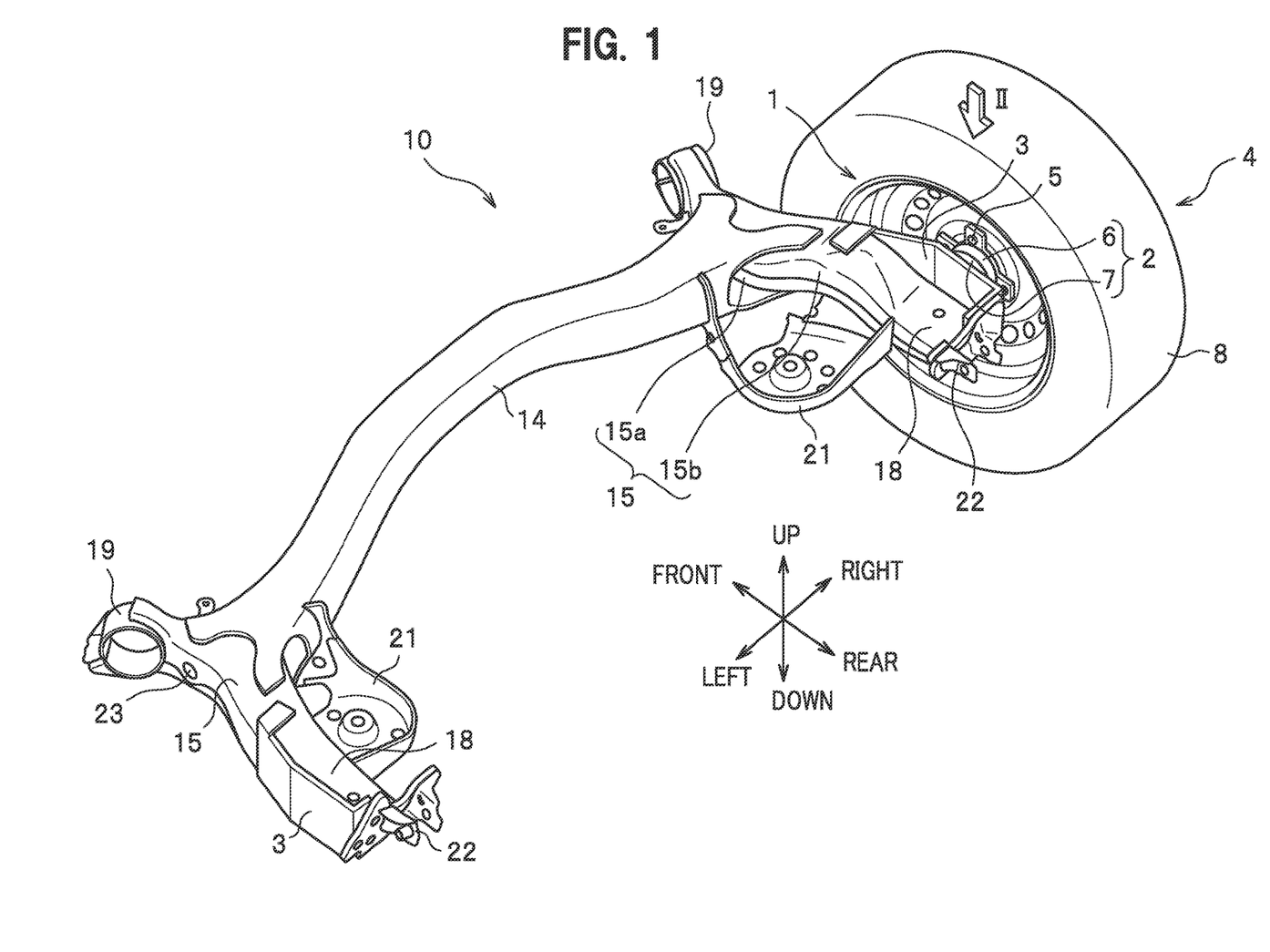
FIG. 1 is a perspective view explaining the configuration of a suspension device having a hub bracket structure according to an embodiment of the present disclosure.

FIG. 1 is a perspective view explaining the configuration of a suspension device 10 having a hub bracket structure 1 according to the present embodiment. Here, the overall configuration of the suspension device 10 will first be explained, followed by a detailed description of the hub bracket structure 1. Note that in FIG. 1, only a rear wheel 4 (wheel) and hub 2 (hub carrier) on the right side are illustrated, and, for convenience of illustration, the rear wheel 4 and hub 2 (hub carrier) on the left side are omitted. Further, in FIG. 1, a reference numeral 8 indicates a tire of the rear wheel 4.

<Suspension Device>

As shown in FIG. 1, the suspension device 10 in the present embodiment supports the rear wheel 4 (wheel) at the rear of the vehicle body, and includes a torsion beam 14 and a pair of trailing arms 15.

The torsion beam 14 extends in the vehicle width direction (right-left direction). The torsion beam 14 in the present embodiment is assumed to have a U-shaped cross section that opens forward, although the illustration is omitted. Note that the cross section of the torsion beam 14 is not limited to this, but can also be a U-shape that opens downward, rearward, or upward.

The trailing arms 15 extending in the front-rear direction are symmetrically joined to both end portions in the vehicle width direction (right-left direction) of the torsion beam 14.

Specifically, the torsion beam 14 is welded or otherwise joined to inner sides of the pair of trailing arms 15 in the vehicle width direction near the front portion thereof.

The trailing arms 15 in the present embodiment are formed of hollow members with an upper half 15b welded and joined from above to a lower half 15a.

Note that an assembly of the torsion beam 14 and trailing arms 15 in the present embodiment is assumed to be made by the tailor welded blank manufacturing method, which is obtained from a plurality of steel plates of different thicknesses and materials that are welded together before press forming to form a single blank, but the assembly is not limited to the above.

In the suspension device 10 as described above, when a load is inputted in the up-down direction from the road surface to the tire 8 to be described later, a spring-like torsion is generated around the axis of the torsion beam 14. At the rear of each of the trailing arms 15, a swinging end portion 18 is formed with the front portion of the trailing arm 15 as the swing center.

Note that in FIG. 1, a reference numeral 19 indicates a bushing provided at the front end portion of each trailing arm 15. The bushing 19 serves as the axial support of the trailing arm 15 to the vehicle body. A reference numeral 21 is a spring seat that receives a lower end portion of a spring (suspension spring), which is not shown in the drawings The spring seat 21 is welded or otherwise joined to the torsion beam 14 and trailing arms 15 so that it spans a corner formed between the torsion beam 14 and trailing arms 15 on the inner side in the vehicle width direction of a hub bracket 3 described below.

Further, a reference numeral 22 indicates mounting portions of dampers (shock absorbers), which are not shown in the drawings. Each damper mounting portion 22 is formed at a rear end portion of the trailing arm 15.

Still further, a reference numeral 23 is a stabilizer bar. In FIG. 1, only an end portion of the stabilizer bar 23 is illustrated. Although not shown, the stabilizer bar 23 extends in the vehicle width direction within the U-shaped cross section of the torsion beam 14 and connects the right and left trailing arms 15 to each other. The torsion beam 14 generates the spring-like torsion described above around the axis of this stabilizer bar 23.

<Hub Bracket Structure>

Next, the hub bracket structure 1 (see FIG. 1) will be described.

As illustrated in FIG. 1, the hub bracket structure 1 includes the hub 2 (hub carrier) and the hub bracket 3.

The hub 2 in the present embodiment includes a hub body 6 having a plurality of stud bolts 5 to fasten the rear wheel 4 (wheel), and a base portion 7 rotatably supporting the hub body 6 on the hub bracket 3.

The hub bracket 3 connects the rear wheel 4 (wheel) via the hub 2 to the swinging end portion 18 of the trailing arm 15.

As illustrated in FIG. 1, the hub bracket 3 is formed of a bent plate. Specifically, the hub bracket 3 is formed by bending a strip-shaped plate (steel plate) to form three side surfaces, which will be explained below. The hub bracket 3 is welded or otherwise joined to an outer surface in the vehicle width direction of the trailing arm 15.

Figure 2:
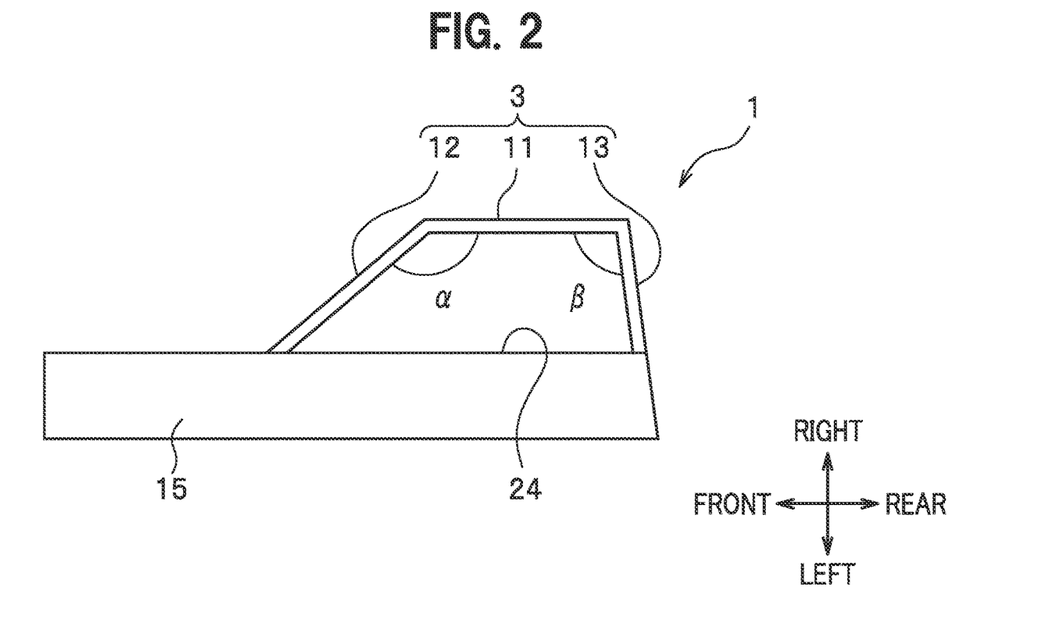
FIG. 2 is a schematic plan view of the hub bracket structure viewed from a direction of an arrow II of FIG. 1.

FIG. 2 is a schematic plan view of the hub bracket structure 1 viewed from the direction of an arrow II of FIG. 1. Note that in FIG. 2, the hub 2 (see FIG. 1) and rear wheel 4 (see FIG. 1) are omitted for convenience of drawing.

As illustrated in FIG. 2, the hub bracket 3 forms a trapezoidal-shaped closed cross section in a top view integrally with an outer surface 24 in the vehicle width direction of the trailing arm 15. Specifically, the hub bracket 3 is formed by bending the strip-shaped plate into three pieces so as to form three side surfaces composed of a hub mounting surface 11, a front connecting surface 12, and a rear connecting surface 13. In other words, the hub bracket 3 in the present embodiment is formed by extending the plate forming these three side surfaces in the up-down direction and is open in the up-down direction (direction perpendicular to the sheet surface of FIG. 2). Note that the hub mounting surface 11 corresponds to the "mounting surface mounted with the hub" as referred to in the scope of claims.

On the hub mounting surface 11, the base portion 7 (see FIG. 1) of the hub 2 (see FIG. 1) is fixed, for example, by welding or fastening with bolts.

The hub mounting surface 11 is a determining factor for standard setting conditions in wheel alignment, such as a toe angle, a camber angle, and a scrub radius, and in the present embodiment, a surface parallel to the outer surface 24 in the vehicle width direction of the trailing arm 15 is assumed as an example of the hub bracket 3.

The front connecting surface 12 extends from a front end of the hub mounting surface 11 to incline toward the outer surface 24 of the trailing arm 15 so as to form one of leg sides of the trapezoidal shape in atop view. Specifically, the front connecting surface 12 is inclined to extend forward from the hub mounting surface 11 toward the outer surface 24 of the trailing arm 15.

Meanwhile, the rear connecting surface 13 extends from a rear end of the hub mounting surface 11 to incline toward the outer surface 24 of the trailing arm 15 so as to form the other of the leg sides of the trapezoidal shape in a top view. Specifically, the rear connecting surface 13 is inclined to extend rearward from the hub mounting surface 11 toward the outer surface 24 of the trailing arms 15.

The length of the trapezoidal-shaped leg side on the front connecting surface 12 is longer than the length of the trapezoidal-shaped leg side on the rear connecting surface 13.

As a result, a first angle ($\alpha$) formed as an interior angle between the hub mounting surface 11 and the front connecting surface 12 of the hub bracket 3 is greater than a second angle ($\beta$) formed as an interior angle between the hub mounting surface 11 and the rear connecting surface 13.

In other words, the first angle ($\alpha$) and the second angle ($\beta$) in the hub bracket 3 in the present embodiment satisfy a relation $\alpha > \beta$ (note that $\beta \geq \Pi/2$, preferably $\beta > \Pi/2$).

Advantageous Effects

Next, advantageous effects of the hub bracket structure 1 according to the present embodiment will be described.

In the hub bracket structure 1 of the present embodiment, each of the three side surfaces of the hub bracket 3, composed of the front connecting surface 12, the hub mounting surface 11, and the rear connecting surface 13, is formed by a plate extending in the up-down direction.

In the hub bracket structure 1 according to the present embodiment, as illustrated in FIG. 2, the first angle ($\alpha$), which is the interior angle between the hub mounting surface 11 and the front connecting surface 12, is greater than the second angle ($\beta$), which is the interior angle between the hub mounting surface 11 and the rear connecting surface 13.

This allows the hub bracket structure 1 to control the toe-in of the tire 8 (see FIG. 1) when a lateral force is applied from the outer side of the wheel, as explained below.

Figure 3:
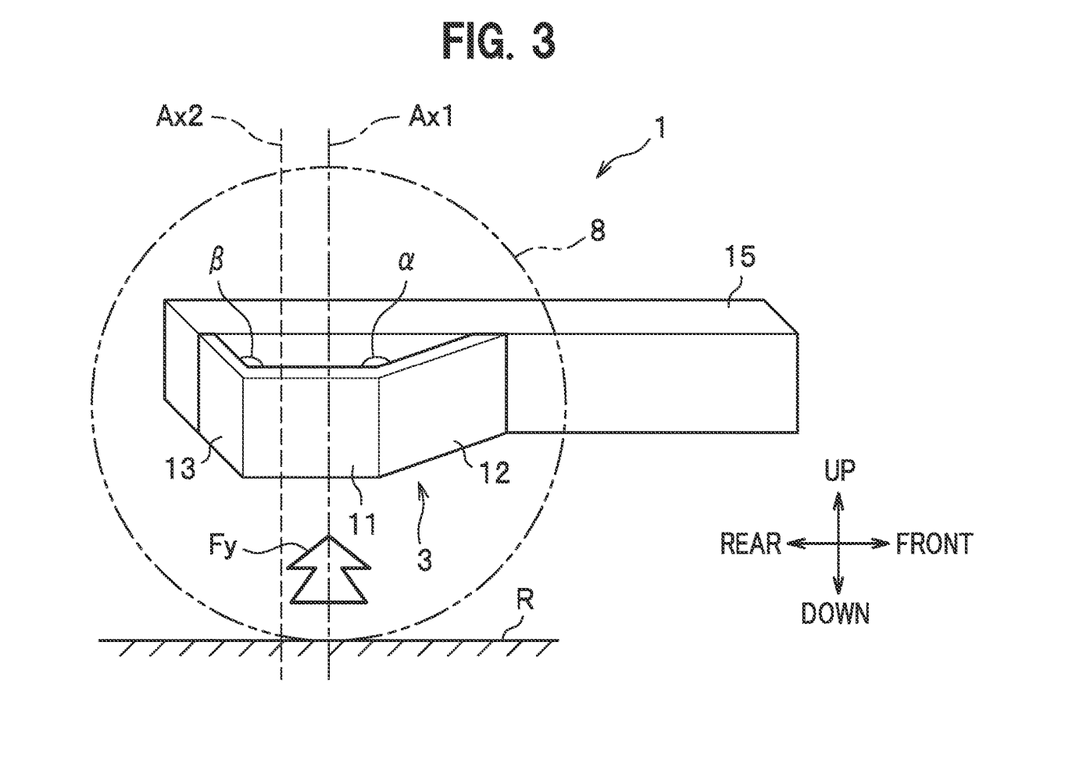
FIG. 3 is an operation explanatory view of the hub bracket structure according to the embodiment of the present disclosure.

FIG. 3 is an operation explanatory view of the hub bracket structure 1 according to the embodiment, to schematically illustrating the hub bracket 3 of FIG. 2 viewed from diagonally upward from the right in a perspective view. Note that in FIG. 3, a reference numeral Ax1 indicates a ground contact axis of the tire 8 (axis passing through the center of rotation of the tire 8 and the ground contact point, which is hereinafter simply referred to as "tire ground contact axis Ax1"), a reference numeral Ax2 indicates an elastic center axis of the hub bracket 3, and a reference numeral R indicates a road surface on which the tire 8 contacts.

In such a case, since the above relation ($\alpha > \beta$) is satisfied, the rigidity of the hub bracket 3 is lower in the front portion of the hub bracket 3 defined by the first angle ($\alpha$) than in the rear portion of the hub bracket 3 defined by the second angle ($\beta$).

Therefore, the elastic center axis Ax2 of the hub bracket 3 is located behind the tire ground contact axis Ax1, resulting in a negative caster trail and toe-in characteristics against a tire lateral force.

According to the hub bracket structure 1 of the embodiment, toe-in control of the tire 8 is made with a simple configuration of the hub bracket 3, to improve the straight-drivability of the vehicle and the stability during braking.

The embodiment of the disclosure has been described above, but the present disclosure is not limited to the above-mentioned embodiment and can be implemented in various forms.

Figure 4:
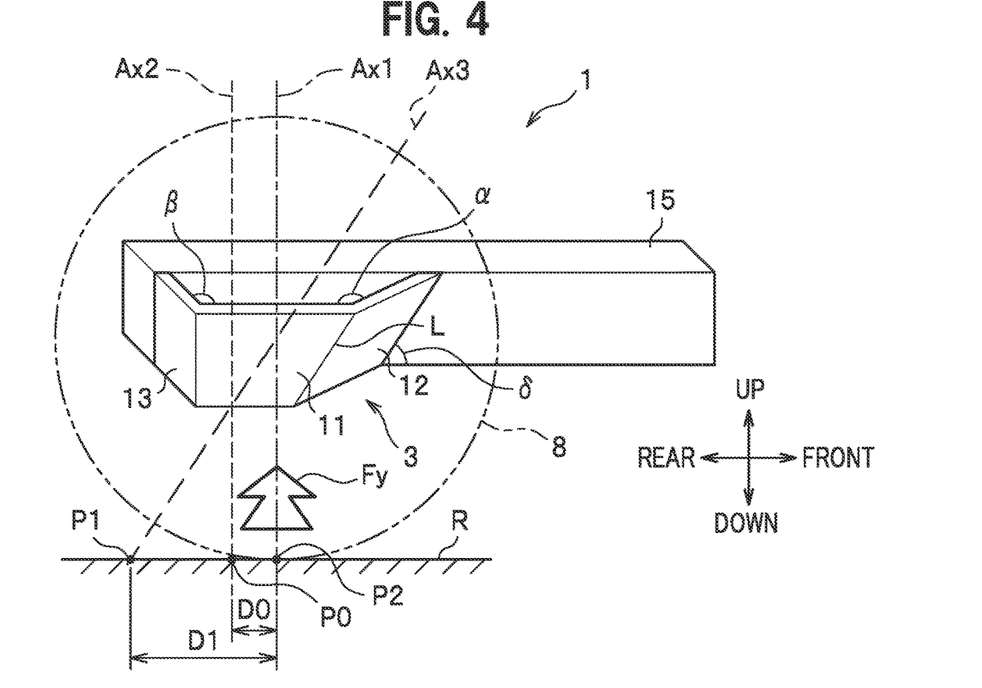
FIG. 4 is a perspective view illustrating the configuration of a first modification of the hub bracket structure and the operation thereof.

FIG. 4 is a perspective view illustrating a first modification of the hub bracket structure 1 and operation thereof. Note that FIG. 4 schematically illustrates the first modification, and an inclination angle of the front connecting surface 12 and an inclination angle of a line L are drawn exaggeratedly for convenience of drawing, and are different from actual ones. In FIG. 4, components similar to those of the hub bracket structure 1 of the above-mentioned embodiment (see FIG. 3) are indicated with the same reference numerals and detailed explanations thereof are omitted.

In the hub bracket structure 1 in the above-mentioned embodiment (see FIG. 3), the line formed by connecting the hub mounting surface 11 and the front connecting surface 12 extends along the up-down direction.

On the other hand, in the hub bracket structure 1 according to the first modification, as illustrated in FIG. 4, the front connecting surface 12 is inclined at an angle ($\delta$) toward the rear so that the surface thereof is gradually displaced downward toward the rear while maintaining the first angle ($\alpha$) with the hub mounting surface 11. In other words, the line L defined by the hub mounting surface 11 and the front connecting surface 12 is inclined rearward from up to down.

As a result, the hub bracket 3 in the first modification differs from the hub bracket 3 of the above-mentioned embodiment (see FIG. 3) in that the elastic center axis Ax2 can be tilted forward as with Ax3, as illustrated in FIG. 4.

In the hub bracket structure 1 according to the first modification, a distance in the front-rear direction between a point P1 where the elastic center axis Ax3 of the hub bracket 3 intersects with the road surface R and a ground contact point P2 of the tire 8 is D1, as illustrated in FIG. 4. On the other hand, a distance in the front-rear direction between a point P0 where the elastic center axis Ax2 of the hub bracket 3 intersects with the road surface R and the ground contact point P2 of the tire 8 in the above-mentioned embodiment is D0.

In other words, the distance D1 in the hub bracket structure 1 according to the first modification is longer than the distance D0 in the above-mentioned embodiment. Therefore, the hub bracket structure 1 according to the first modification can take a larger negative caster trail compared to the hub bracket structure 1 in the above-mentioned embodiment, and a moment at the center of the elastic center axis Ax3 becomes larger. That is, in the hub bracket structure 1 according to the first modification (see FIG. 4), a large toe-in state can be achieved even with the same lateral force as in the hub bracket structure 1 according to the above-mentioned embodiment (see FIG. 3).

The rear connecting surface 13 of the hub bracket structure 1 according to the first modification does not have to be inclined as in the rear connecting surface 13 in the above-mentioned embodiment, or may be configured to incline forward as in the second modification described below.

Figure 5:
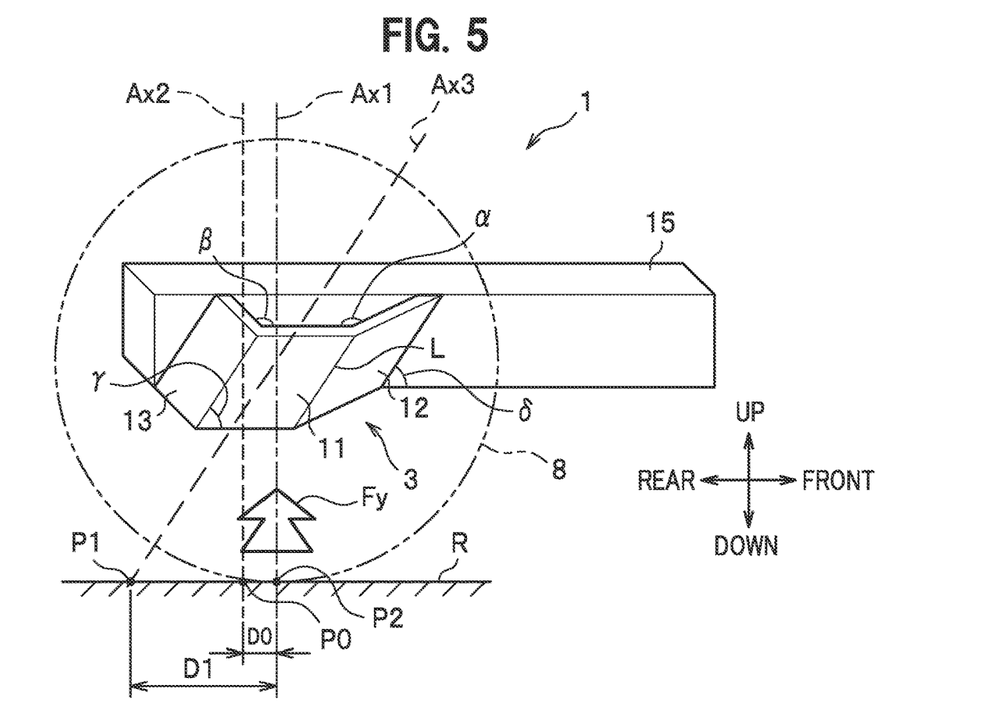
FIG. 5 is a perspective view illustrating the configuration of a second modification of the hub bracket structure and the operation thereof.

FIG. 5 is a perspective view illustrating a second modification of the hub bracket structure 1 and operation thereof. In FIG. 5, components similar to the hub bracket structure 1 of the above-mentioned embodiment (see FIG. 3) and the hub bracket structure 1 according to the first modification (see FIG. 4) are indicated with the same reference numerals and the detailed explanations thereof are omitted.

As illustrated in FIG. 5, the hub bracket structure 1 according to the second modification differs from the hub bracket structure 1 according to the first modification illustrated in FIG. 4 in that the rear connecting surface 13 is inclined at an angle ($\gamma$) toward the rear so that the surface thereof is gradually displaced downward toward the rear while maintaining the first angle ($\beta$) with the hub mounting surface 11. In other words, the hub mounting surface 11 in the second modification is a parallelogram in side view.

In the hub bracket structure 1 according to the second modification, the elastic center axis Ax3 of the hub bracket 3 is inclined toward the rear more effectively.

Figure 6A:
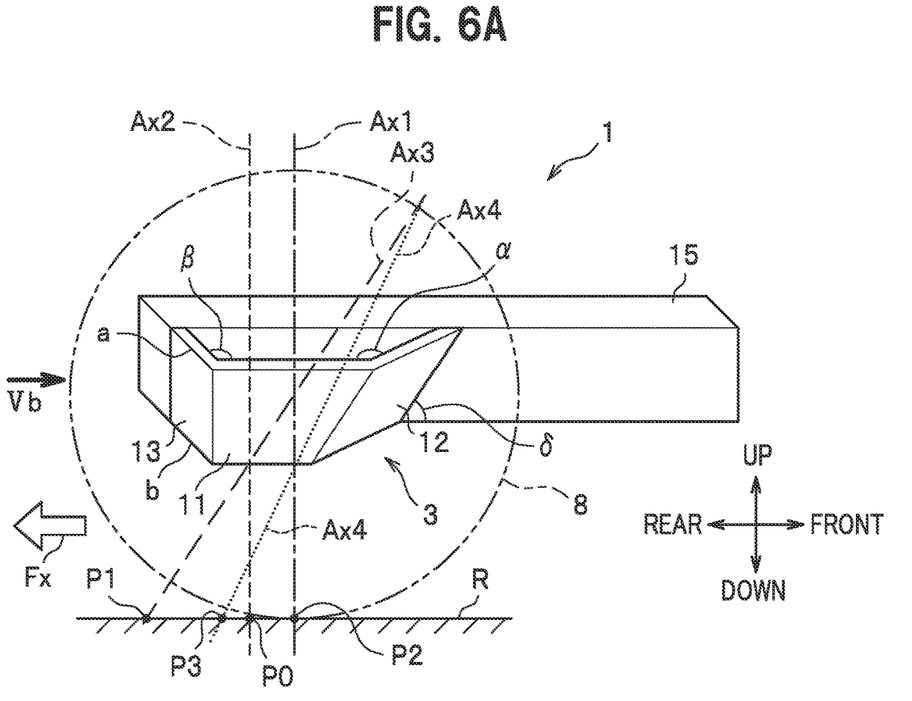
FIG. 6A is a perspective view illustrating the configuration of a third modification of the hub bracket structure and the operation thereof.
Figure 6B:
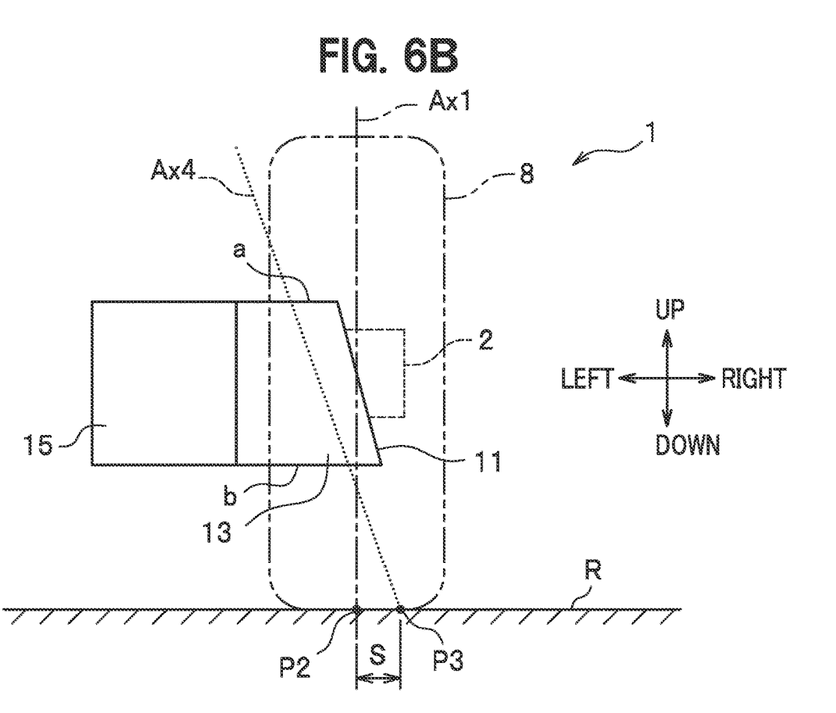
FIG. 6B is a rear view illustrating the configuration and operation of the hub bracket structure according to the third modification viewed from the direction Vb of FIG. 6A.

FIG. 6A is a perspective view illustrating a configuration of a third modification of the hub bracket structure 1 and operation thereof. FIG. 6B is a rear view illustrating the configuration and operation of the hub bracket structure 1 according to the third modification viewed from a direction Vb of FIG. 6A. Note that FIGS. 6A and 6B schematically illustrate the third modification, and an inclination angle of the front connecting surface 12 and an inclination angle of the hub mounting surface 11 are drawn exaggeratedly for convenience of drawing, and are different from actual ones. In FIGS. 6A and 6B, components similar to the hub bracket structure 1 of the above-mentioned embodiment (see FIG. 3) and the hub bracket structure 1 according to the first modification (see FIG. 4) are indicated with the same reference numerals and the detailed explanations thereof are omitted.

As illustrated in FIG. 6A, in the hub bracket structure 1 according to the third modification, the front connecting surface 12 is inclined at an angle ($\delta$) toward the rear so that the surface thereof is gradually displaced downward toward the rear while maintaining the first angle (α) with the hub mounting surface 11.

In the hub bracket structure 1 according to the third modification, as illustrated in FIG. 6B, the hub mounting surface 11 is inclined outward in the vehicle width direction (right side in the right-left direction) from up to down. In other words, as illustrated in FIGS. 6A and 6B, a length of a lower side b of the rear connecting surface 13 is longer than a length of an upper side a (a<b).

In the hub bracket structure 1 of the third modification, an elastic center axis Ax4 of the hub bracket 3 is inclined outward in the vehicle width direction (right side in the right-left direction) from up to down, as illustrated in FIG. 6B. In other words, the elastic center axis of the first modification, which is marked with the reference numeral Ax3 in FIG. 6A, is displaced outward in the vehicle width direction, to be the elastic center axis Ax4 in the third modification, as illustrated in FIG. 6A.

As a result, in the hub bracket structure 1 according to the third modification, as illustrated in FIG. 6B, a point P3 where the elastic center axis Ax4 of the hub bracket 3 intersects with the road surface R increases its distance, that is, a negative scrub radius S, outward in the vehicle width direction (right side in the right-left direction) of the ground contact point P2 of the tire 8.

In the hub bracket structure 1 according to the third modification, the toe-in state can be controlled during braking as well as when the vehicle is turning.

Figure 7:
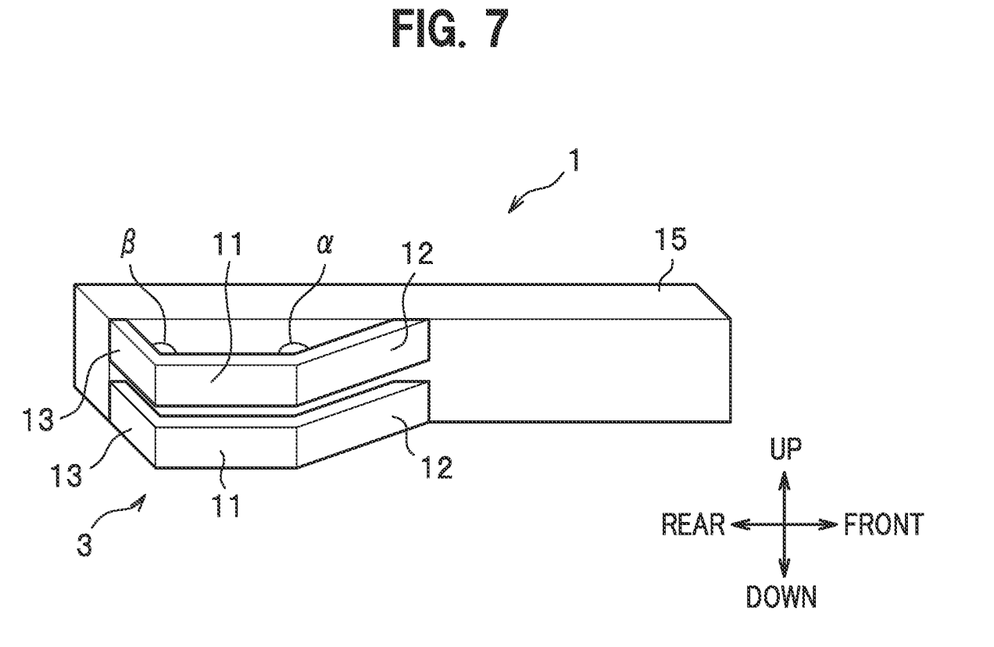
FIG. 7 is a perspective view illustrating a fourth modification of the hub bracket structure.

FIG. 7 is a perspective view illustrating a fourth modification of the hub bracket structure 1.

The three side surfaces of the hub mounting surface 11 (see

FIG. 3), the front connecting surface 12 (see FIG. 3), and the rear connecting surface 13 (see FIG. 3) in the above-mentioned embodiment are each formed of a single surface, but these three side surfaces may be individually divided into multiple pieces.

As illustrated in FIG. 7, in the hub bracket structure 1 according to the fourth modification, the hub mounting surface 11, the front connecting surface 12, and the rear connecting surface 13 are each divided into two pieces in the up-down direction. Note that the number of divisions of these three side surfaces may be three or more.

Although not illustrated, only one or two side surfaces selected from the hub mounting surface 11, the front connecting surface 12, and the rear connecting surface 13 may be divided into multiple pieces.

In the hub bracket structure 1 according to the fourth modification, the difference in rigidity in the front-rear direction in the hub bracket 3 can be set more precisely.

The hub brackets 3 in the hub bracket structure 1 of the above-mentioned embodiment (see FIG. 3) and the hub bracket structure 1 according to the first to fourth modifications (see FIGS. 4 to 7) are assumed to be open on up and down as described above. However, these hub brackets 3 (see FIGS. 3 to 7) may also be configured such that the upper or lower side of any of the hub mounting surface 11, the front connecting surface 12, and the rear connecting surface 13 is connected to the trailing arm 15 by a plate.

In the hub bracket structure 1, although not shown, provided that the relationship α>β for the first angle (α) and the second angle (α) in the hub bracket 3 is satisfied, the angles of the hub mounting surface 11, the front connecting surface 12, and the rear connecting surface 13 to a reference surface (such as the road surface R) maybe designed and changed as necessary without being limited to the aforementioned angles.

A method of joining the hub bracket 3 to the trailing arms 15 and a method of joining the hub 2 to the hub bracket 3 are not limited to the aforementioned welding, but various joining methods such as bolting, gluing, riveting, and clamping may be employed.

Further, the point P0 where the elastic center axis Ax2 intersects with the road surface R, the point P1 where the elastic center axis Ax3 intersects with the road surface R, the ground contact point P2 of the tire 8, and the point P3 where the elastic center axis Ax4 intersects with the road surface R in the above embodiment and the modifications thereof do not necessarily have to coincide in the vehicle width direction, and some deviation is allowed.

However, it is desirable for the points P1 to P3 to be located on the outer side in the vehicle width direction than point P0. Even if the points P1 to P3 are located on the inner side in the vehicle width direction than the point P0, it is desirable that they are located as close to the outer side in the vehicle width direction as possible.

The hub mounting surfaces 11 in the first modification and second modification may also be configured to be inclined as with the hub mounting surface 11 in the third modification.

What is claimed is:

1. A hub bracket structure comprising:
a trailing arm that extends in a vehicle front-rear direction, with one end thereof axially supported by a vehicle body in a manner swingable up and down;
a hub that rotatably supports a wheel; and
a hub bracket that connects the trailing arm and the hub, wherein
the hub bracket includes
a mounting surface that extends in up-down and front-rear directions and is mounted with the hub,
a front connecting surface that connects a front portion of the mounting surface to the trailing arm, and
a rear connecting surface that connects a rear portion of the mounting surface to the trailing arm,
each of the front connecting surface and the rear connecting surface is formed in a plate shape extending in up-down and vehicle width directions,
an angle formed by the mounting surface and the front connecting surface is greater than an angle formed by the mounting surface and the rear connecting surface, and
a line formed by connecting the mounting surface and the front connecting surface is inclined rearward from up to down.

2. The hub bracket structure according to claim 1, wherein the mounting surface is inclined outward in the vehicle width direction from up to down.

* * * * *